United States Patent [19]
Kiser

[11] Patent Number: 5,974,722
[45] Date of Patent: Nov. 2, 1999

[54] COMBINATION FISHING ROD

[76] Inventor: Ronald G. Kiser, 25 Hamburg Rd., Greenville, Pa. 16125

[21] Appl. No.: 09/074,159

[22] Filed: May 7, 1998

[51] Int. Cl.[6] ........................... A01K 87/00; A01K 87/02
[52] U.S. Cl. .................................................. 43/18.1; 43/23
[58] Field of Search .................................... 43/18.1, 18.5, 43/23

[56] References Cited

U.S. PATENT DOCUMENTS

| | | | |
|---|---|---|---|
| 764,398 | 7/1904 | Upton | 43/23 |
| 814,321 | 3/1906 | Pepper | 43/18.1 |
| 828,557 | 8/1906 | Levison | 43/23 |
| 1,527,463 | 2/1925 | Bastman | 43/18.1 |
| 2,566,647 | 9/1951 | Wissman | 43/18.1 |
| 3,121,290 | 2/1964 | Brown | 43/18.1 |
| 4,067,133 | 1/1978 | Livingston | 43/18.1 |
| 4,860,485 | 8/1989 | Rhoton | 43/18.1 |

*Primary Examiner*—Kurt Rowan

[57] ABSTRACT

A new combination fishing rod for fishing and ice fishing. The inventive device includes a handle with one end of an elongate support shaft inserted into a hole in one end of the handle. The other end of the support shaft is inserted into a first bore of the first end of an elongate combination insertion member. The second end of the combination insertion member has an elongate second bore therein. The combination insertion member has an annular wall provided in the second bore of the combination insertion member which divides the second bore of the combination insertion member into an annular outer portion and a central portion. The fishing rod also includes a butt shaft and a tip shaft. The first end of the butt shaft is insertable into the outer portion of the second bore of the combination insertion member. The first end of the tip shaft is insertable into the second bore of the second end of the butt shaft and is also insertable into the central portion of the second bore of the combination insertion member.

7 Claims, 3 Drawing Sheets

COMBINATION FISHING ROD

BACKGROUND OF THE INVENTION

1. Field of the Invention

The present invention relates to fishing rods and more particularly pertains to a new combination fishing rod for fishing and ice fishing.

2. Description of the Prior Art

The use of fishing rods is known in the prior art. More specifically, fishing rods heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing rods include U.S. Pat. No. 4,067,133; U.S. Pat. No. 4,860,485; U.S. Pat. No. 3,432,958; U.S. Pat. No. 4,183,163; U.S. Pat. No. 4,541,197; and U.S. Pat. No. 2,005,081.

While these devices fulfill their respective, particular objectives and requirements, the aforementioned patents do not disclose a new combination fishing rod. The inventive device includes a handle with one end of an elongate support shaft inserted into a hole in one end of the handle. The other end of the support shaft is inserted into a first bore of the first end of an elongate combination insertion member. The second end of the combination insertion member has an elongate second bore therein. The combination insertion member has an annular wall provided in the second bore of the combination insertion member which divides the second bore of the combination insertion member into an annular outer portion and a central portion. The fishing rod also includes a butt shaft and a tip shaft. The first end of the butt shaft is insertable into the outer portion of the second bore of the combination insertion member. The first end of the tip shaft is insertable into the second bore of the second end of the butt shaft and is also insertable into the central portion of the second bore of the combination insertion member.

In these respects, the combination fishing rod according to the present invention substantially departs from the conventional concepts and designs of the prior art, and in so doing provides an apparatus primarily developed for the purpose of fishing and ice fishing.

SUMMARY OF THE INVENTION

In view of the foregoing disadvantages inherent in the known types of fishing rods now present in the prior art, the present invention provides a new combination fishing rod construction wherein the same can be utilized for fishing and ice fishing.

The general purpose of the present invention, which will be described subsequently in greater detail, is to provide a new combination fishing rod apparatus and method which has many of the advantages of the fishing rods mentioned heretofore and many novel features that result in a new combination fishing rod which is not anticipated, rendered obvious, suggested, or even implied by any of the prior art fishing rods, either alone or in any combination thereof.

To attain this, the present invention generally comprises a handle with one end of an elongate support shaft inserted into a hole in one end of the handle. The other end of the support shaft is inserted into a first bore of the first end of an elongate combination insertion member. The second end of the combination insertion member has an elongate second bore therein. The combination insertion member has an annular wall provided in the second bore of the combination insertion member which divides the second bore of the combination insertion member into an annular outer portion and a central portion. The fishing rod also includes a butt shaft and a tip shaft. The first end of the butt shaft is insertable into the outer portion of the second bore of the combination insertion member. The first end of the tip shaft is insertable into the second bore of the second end of the butt shaft and is also insertable into the central portion of the second bore of the combination insertion member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination fishing rod apparatus and method which has many of the advantages of the fishing rods mentioned heretofore and many novel features that result in a new combination fishing rod which is not anticipated, rendered obvious, suggested, or even implied by any of the prior art fishing rods, either alone or in any combination thereof.

It is another object of the present invention to provide a new combination fishing rod which may be easily and efficiently manufactured and marketed.

It is a further object of the present invention to provide a new combination fishing rod which is of a durable and reliable construction.

An even further object of the present invention is to provide a new combination fishing rod which is susceptible of a low cost of manufacture with regard to both materials and labor, and which accordingly is then susceptible of low prices of sale to the consuming public, thereby making such combination fishing rod economically available to the buying public.

Still yet another object of the present invention is to provide a new combination fishing rod which provides in the apparatuses and methods of the prior art some of the advantages thereof, while simultaneously overcoming some of the disadvantages normally associated therewith.

Still another object of the present invention is to provide a new combination fishing rod for fishing and ice fishing.

Yet another object of the present invention is to provide a new combination fishing rod which includes a handle with one end of an elongate support shaft inserted into a hole in one end of the handle. The other end of the support shaft is inserted into a first bore of the first end of an elongate combination insertion member. The second end of the combination insertion member has an elongate second bore therein. The combination insertion member has an annular wall provided in the second bore of the combination insertion member which divides the second bore of the combination insertion member into an annular outer portion and a central portion. The fishing rod also includes a butt shaft and a tip shaft. The first end of the butt shaft is insertable into the outer portion of the second bore of the combination insertion member. The first end of the tip shaft is insertable into the second bore of the second end of the butt shaft and is also insertable into the central portion of the second bore of the combination insertion member.

Still yet another object of the present invention is to provide a new combination fishing rod that permits direct attachment of both the butt shaft portion and the tip shaft portion to a handle so that the rod may be used for regular fishing with a longer rod or for ice fishing with a shorter rod.

Even still another object of the present invention is to provide a new combination fishing rod that provides a fisher with two types of fishing rods in one fishing rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
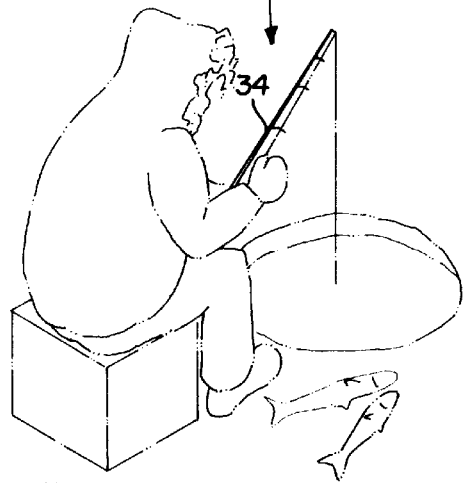
FIG. 1 is a schematic perspective view of the shortened ice fishing rod of a new combination fishing rod according to the present invention.

With reference now to the drawings, and in particular to FIGS. 1 through 4 thereof, a new combination fishing rod embodying the principles and concepts of the present invention and generally designated by the reference numeral 10 will be described.

As best illustrated in FIGS. 1 through 4, the combination fishing rod 10 generally comprises a handle 11 with one end 15 of an elongate support shaft 14 inserted into a hole 38 in one end 13 of the handle 11. The other end 16 of the support shaft 14 is inserted into a first bore 20 of the first end of an elongate combination insertion member 17. The second end 19 of the combination insertion member 17 has an elongate second bore therein. The combination insertion member 17 has an annular wall 21 provided in the second bore of the combination insertion member 17 which divides the second bore of the combination insertion member 17 into an annular outer portion 22 and a central portion 23. The fishing rod also includes a butt shaft 26 and a tip shaft 34. The first end 27 of the butt shaft 26 is insertable into the outer portion 22 of the second bore of the combination insertion member 17. The first end 35 of the tip shaft 34 is insertable into the second bore of the second end 28 of the butt shaft 26 and is also insertable into the central portion 23 of the second bore of the combination insertion member 17.

In closer detail, the handle 11 has first and second ends 12,13. The second end 13 of the handle 11 has a cylindrical hole 38 therein extending towards the first end 12 of the handle 11 preferably, all the way through the handle 11 up to the first end (butt cap) 12 of the handle 11. The elongate support shaft 14 is generally cylindrical and has a pair of opposite ends 15,16. One of the ends 15 of the support shaft 14 is removably inserted into the hole 38 of the handle 11 such that the other end 16 of the support shaft 14 outwardly extends from the second end 13 of the handle 11. The support shaft 14 is preferably coaxial with the handle 11 when inserted into the hole 38 of the first end 12 of the handle 11.

The elongate combination insertion member 17 is generally cylindrical and has first and second ends 18,19 and an axis extending through the ends of 18,19. The first end 18 of the combination insertion member 17 has a generally cylindrical first bore 20 therein extending towards the second end 19 of the combination insertion member 17. Preferably, the axis of the first bore 20 of the combination insertion member 17 is coaxial with the axis of the combination insertion member 17. The outwardly extending end 16 of the support shaft 14 is inserted into the first bore 20 of the first end 18 of the combination insertion member 17 to attach the combination insertion member 17 to the handle 11.

Figure 4:
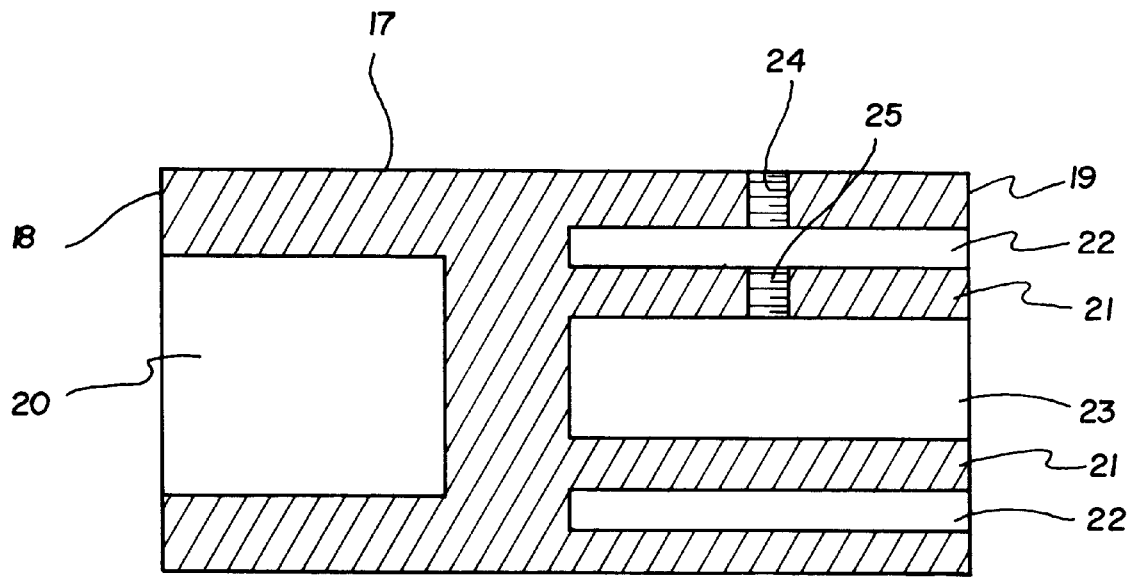
FIG. 4 is a schematic cross sectional view of the combination insertion member of the present invention.

With reference to FIG. 4, the second end 19 of the combination insertion member 17 has an elongate second bore therein extending towards the first end 18 of the combination insertion member 17. The second bore of the combination insertion member 17 is generally cylindrical with the axis of the second bore preferably coaxial with the axis of the combination insertion member 17. The combination insertion member 17 has an annular wall 21 provided in the second bore of the combination insertion member 17. Preferably, the annular wall 21 of the combination insertion member 17 is coaxial with the second bore of the combination insertion member 17 and with the axis of the combination insertion member 17. The annular wall 21 of the combination insertion member 17 divides the second bore of the combination insertion member 17 into an annular outer portion 22 and a generally cylindrical central portion 23. The combination insertion member 17 preferably has a first threaded opening 24 into the second bore of the combination insertion member 17. The annular wall 21 of the combination insertion member 17 also has a second threaded opening 25 therethrough which is coaxial with the first threaded opening 24.

Figure 2:
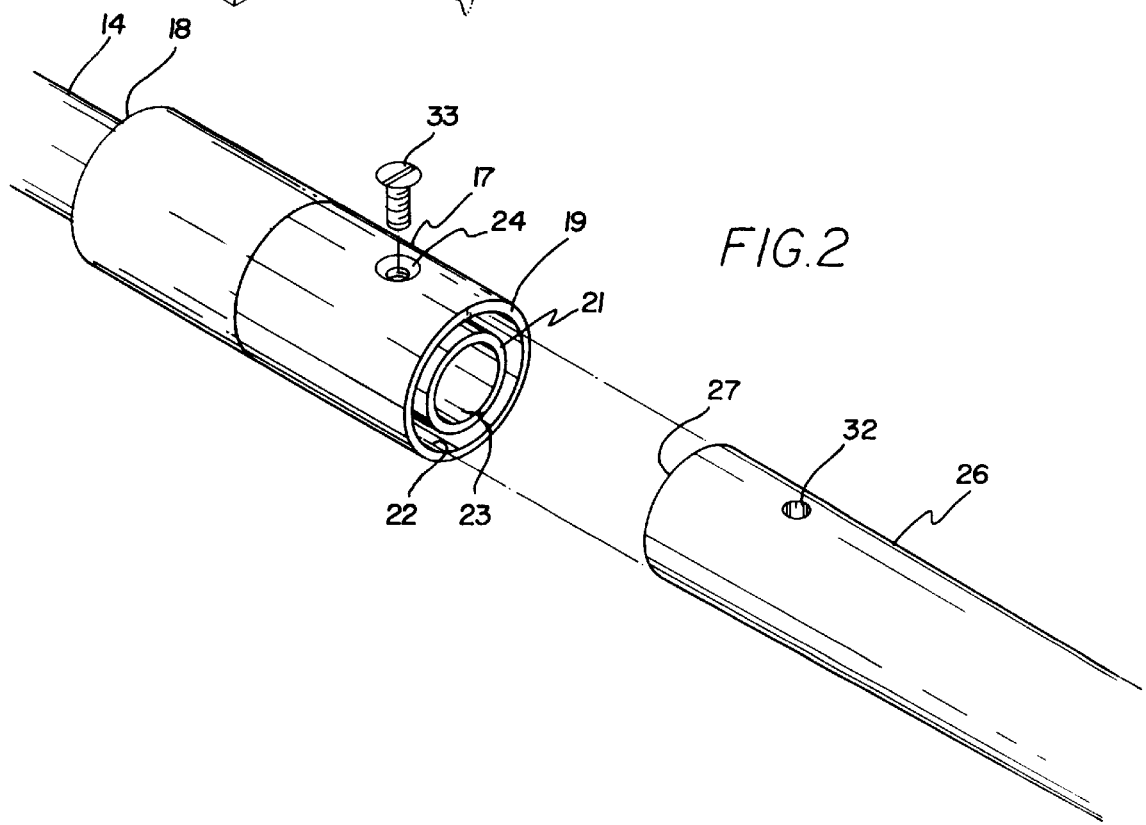
FIG. 2 is a schematic exploded perspective view of the first end of the butt shaft and the second end of the combination insertion member of the present invention.
Figure 3:
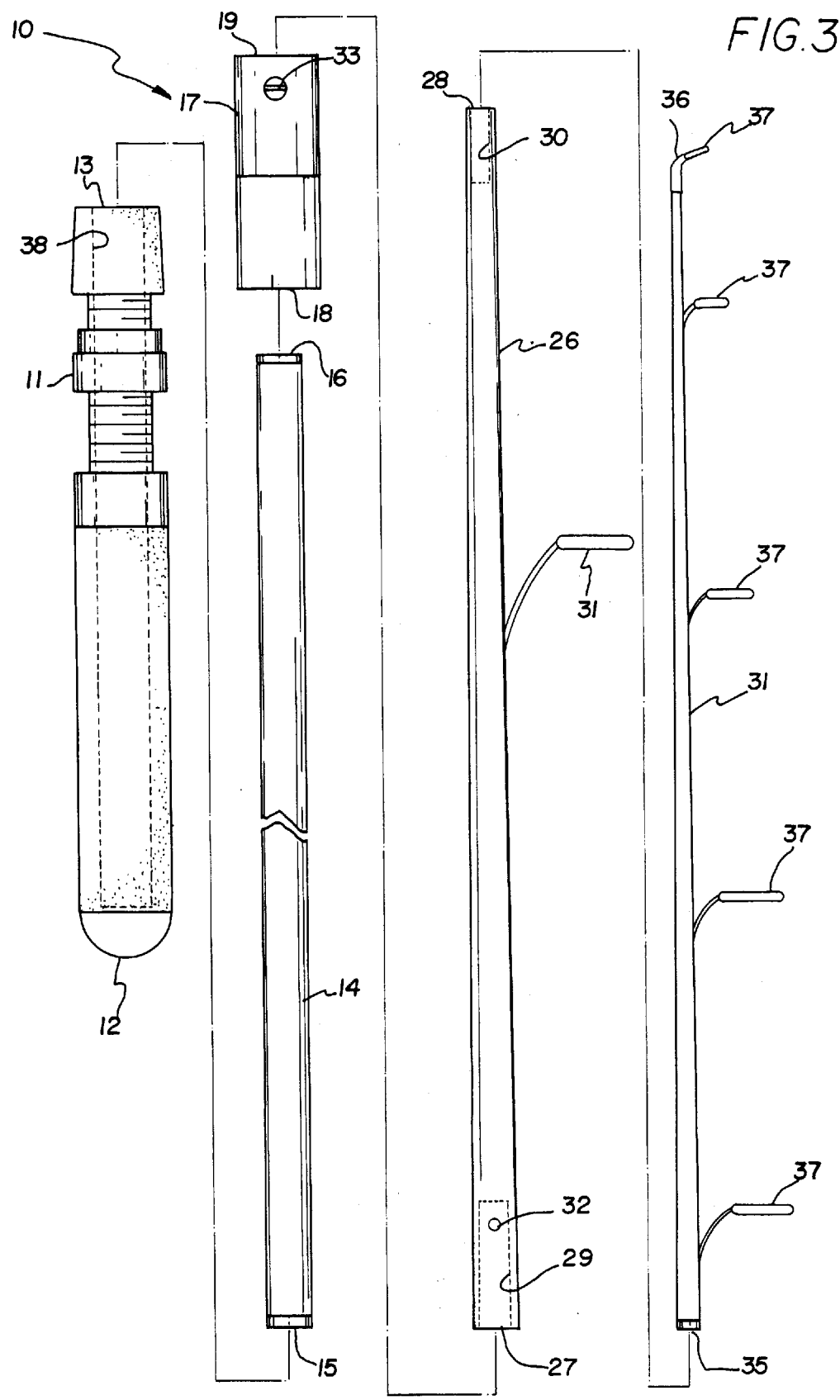
FIG. 3 is a schematic exploded side view of the present invention.

The elongate butt shaft 26 has first and second ends 27,28 and a butt guide 31. The first end 27 of the butt shaft 26 has a first bore 29 therein while the second end 28 of the butt shaft 26 has a second bore 30 therein. The first and second bores 29,30 of the butt shaft 26 are preferably coaxial with the axis of the butt shaft 26. The butt shaft 26 has a third threaded opening 32 into the first bore 29 of the butt shaft 26. The first end 27 of the butt shaft 26 is insertable into the outer portion 22 of the second bore of the combination insertion member 17 such that the annular wall 21 of the combination insertion member 17 is inserted into the first bore 29 of the butt shaft 26, the third threaded opening 32 of the butt shaft 26 are coaxially alignable with the first and second threaded openings 24,25 of the combination insertion member 17 when the first end 27 of the butt shaft 26 is inserted into the outer portion 22 of the second bore of the combination insertion member 17. As illustrated in FIG. 2, a threaded fastener 33 is extendable through the first and second threaded openings 24,25 of the combination insertion member 17 and the third threaded opening 32 of the butt shaft 26 when the threaded openings are generally coaxially aligned such that the threaded fastener 33 helps hold the butt shaft 26 to the combination insertion member 17.

The elongate tip shaft 34 has first and second ends 35,36 and a plurality of guides 37. In use, the first end 35 of the tip shaft 34 is insertable into the second bore 30 of the butt shaft 26 to form a standard fishing rod. Additionally, the first end 35 of the tip shaft 34 may be inserted into the central portion 23 of the second bore of the combination insertion member 17 to form a shortened ice fishing rod as depicted in FIG. 1. In this shortened embodiment, the threaded fastener 33 is extendable through the first and second threaded openings 24,25 of the combination insertion member 17 when the first end 35 of the tip shaft 34 is inserted into the central portion 23 of the second bore of the combination insertion member 17 such that the threaded fastener 33 helps hold the tip shaft 34 to the combination insertion member 17.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod, comprising:
    a handle having first and second ends, said second end of said handle having a hole therein extending towards said first end of said handle;
    an elongate support shaft having a pair of opposite ends, one of said ends of said support shaft being removably inserted into said hole of said handle such that the other end of said support shaft outwardly extends from said second end of said handle;
    an elongate combination insertion member having first and second ends;
    said first end of said combination insertion member having a first bore therein extending towards said second end of said combination insertion member;
    said second end of said support shaft being inserted into said first bore of said first end of said combination insertion member;
    said second end of said combination insertion member having an elongate second bore therein extending towards said first end of said combination insertion member;
    said combination insertion member having an annular wall provided in said second bore of said combination insertion member;
    said annular wall of said combination insertion member dividing said second bore of said combination insertion member into an annular outer portion and a central portion;
    an elongate butt shaft having first and second ends, said first end of said butt shaft having a first bore therein, said second end of said butt shaft having a second bore therein;
    said first end of said butt shaft being insertable into said outer portion of said second bore of said combination insertion member; and
    a tip shaft having first and second ends, said first end of said tip shaft being insertable into said second bore of said butt shaft, said first end of said tip shaft being insertable into said central portion of said second bore of said combination insertion member.

2. The fishing rod of claim 1, wherein said first bore of said combination insertion member is coaxial with said combination insertion member, wherein said second bore of said combination insertion member is coaxial with said combination insertion member, and wherein said annular wall of said combination insertion member is coaxial with said second bore of said combination insertion member.

3. The fishing rod of claim 1, wherein said combination insertion member has a first threaded opening into said second bore of said combination insertion member, wherein said annular wall of said combination insertion member having a second threaded opening therethrough, said first and second threaded openings being coaxial with one another.

4. The fishing rod of claim 3, wherein said butt shaft has a third threaded opening into said first bore of said butt shaft, said third threaded opening of said butt shaft being coaxially alignable with said first and second threaded openings of said combination insertion member when said first end of said butt shaft is inserted into said outer portion of said second bore of said combination insertion member.

5. The fishing rod of claim 4, further comprising a threaded fastener being extendable through said first and second threaded openings of said combination insertion member and said third threaded opening of said butt shaft when said threaded openings are generally coaxially aligned such that said threaded fastener helps hold said butt shaft to said combination insertion member.

6. The fishing rod of claim 2, further comprising a threaded fastener being extendable through said first and second threaded openings of said combination insertion member when said first end of said tip shaft is inserted into said central portion of said second bore of said combination insertion member such that said threaded fastener helps hold said tip shaft to said combination insertion member.

7. A fishing rod, comprising:
    a handle having first and second ends, said second end of said handle having a hole therein extending towards said first end of said handle;

an elongate support shaft being generally cylindrical and having a pair of opposite ends, one of said ends of said support shaft being removably inserted into said hole of said handle such that the other end of said support shaft outwardly extends from said second end of said handle;

an elongate combination insertion member being generally cylindrical and having first and second ends and an axis extending through said ends of said combination insertion member;

said first end of said combination insertion member having a generally cylindrical first bore therein extending towards said second end of said combination insertion member, said first bore of said combination insertion member being coaxial with said combination insertion member;

said second end of said support shaft being inserted into said first bore of said first end of said combination insertion member;

said second end of said combination insertion member having an elongate second bore therein extending towards said first end of said combination insertion member, said second bore of said combination insertion member being generally cylindrical, said second bore being coaxial with said combination insertion member;

said combination insertion member having an annular wall provided in said second bore of said combination insertion member, said annular wall of said combination insertion member being coaxial with said second bore of said combination insertion member;

said annular wall of said combination insertion member dividing said second bore of said combination insertion member into an annular outer portion and a generally cylindrical central portion;

said combination insertion member having a first threaded opening into said second bore of said combination insertion member;

said annular wall of said combination insertion member having a second threaded opening therethrough, said first and second threaded openings being coaxial with one another;

an elongate butt shaft having first and second ends and a guide, said first end of said butt shaft having a first bore therein, said second end of said butt shaft having a second bore therein, said butt shaft having a third threaded opening into said first bore of said butt shaft;

said first end of said butt shaft being insertable into said outer portion of said second bore of said combination insertion member such that said annular wall of said combination insertion member is inserted into said first bore of said butt shaft, said third threaded opening of said butt shaft being coaxially alignable with said first and second threaded openings of said combination insertion member when said first end of said butt shaft is inserted into said outer portion of said second bore of said combination insertion member;

a threaded fastener being extendable through said first and second threaded openings of said combination insertion member and said third threaded opening of said butt shaft when said threaded openings are generally coaxially aligned such that said threaded fastener helps hold said butt shaft to said combination insertion member;

a tip shaft having first and second ends and a plurality of guides, said first end of said tip shaft being insertable into said second bore of said butt shaft, said first end of said tip shaft being insertable into said central portion of said second bore of said combination insertion member; and said threaded fastener being extendable through said first and second threaded openings of said combination insertion member when said first end of said tip shaft is inserted into said central portion of said second bore of said combination insertion member such that said threaded fastener helps hold said tip shaft to said combination insertion member.

\* \* \* \* \*